(12) United States Patent
Linck et al.

(10) Patent No.: US 8,673,188 B2
(45) Date of Patent: Mar. 18, 2014

(54) CARBON-CARBON PARTS AND METHODS FOR MAKING SAME

(75) Inventors: John S. Linck, Peublo, CO (US); Chris T. Kirkpatrick, Pueblo West, CO (US)

(73) Assignee: Goodrich Corporation, Charlotte, NC (US)

( * ) Notice: Subject to any disclaimer, the term of this patent is extended or adjusted under 35 U.S.C. 154(b) by 1577 days.

(21) Appl. No.: 11/353,883

(22) Filed: Feb. 14, 2006

(65) Prior Publication Data

US 2007/0186396 A1    Aug. 16, 2007

(51) Int. Cl.
*D01C 5/00*    (2006.01)
*C01B 31/00*   (2006.01)

(52) U.S. Cl.
USPC ....... 264/29.2; 264/29.1; 264/29.3; 264/29.4; 264/29.5; 264/29.6; 118/715; 28/112

(58) Field of Classification Search
USPC ............ 264/29.1, 29.2, 29.4, 29.6, 29.7, 605, 264/607, 608
See application file for complete search history.

(56) References Cited

U.S. PATENT DOCUMENTS

| | | | |
|---|---|---|---|
| 3,867,491 A | 2/1975 | Marin | 264/29 |
| 3,895,084 A | 7/1975 | Bauer | 264/29 |
| 3,991,248 A | 11/1976 | Bauer | 428/245 |
| 4,212,906 A | 7/1980 | Fisher et al. | 427/237 |
| 4,339,021 A | 7/1982 | Kosuda et al. | 191/50 |
| 4,396,663 A * | 8/1983 | Mitchell et al. | 428/111 |
| 4,790,052 A * | 12/1988 | Olry | 28/110 |
| 5,059,378 A | 10/1991 | Petterson et al. | 264/258 |
| 5,312,660 A | 5/1994 | Morris et al. | 428/36.3 |
| 5,388,320 A | 2/1995 | Smith et al. | |
| 5,433,937 A | 7/1995 | Sohda et al. | 423/445 R |
| 5,456,981 A | 10/1995 | Olry et al. | |
| 5,480,678 A * | 1/1996 | Rudolph et al. | 427/248.1 |
| 5,580,500 A * | 12/1996 | Muramatsu et al. | 264/29.1 |
| 5,599,603 A * | 2/1997 | Evans et al. | 428/66.2 |
| 5,609,707 A | 3/1997 | Bazshushtari et al. | 156/148 |
| 5,614,134 A | 3/1997 | Sohda et al. | |
| 5,634,535 A | 6/1997 | Fennell et al. | 188/73.2 |
| 5,654,059 A * | 8/1997 | Hecht | 428/65.9 |
| 5,702,542 A | 12/1997 | Brown et al. | |
| 5,705,008 A | 1/1998 | Hecht | |
| 5,733,484 A | 3/1998 | Uchida et al. | 264/29.1 |
| 5,792,715 A | 8/1998 | Duval et al. | 442/328 |

(Continued)

FOREIGN PATENT DOCUMENTS

JP    1203267    8/1989

OTHER PUBLICATIONS

Byrne, Christopher, "*Influence of Needled Felt C/C Processing on Friction Performance,*" obtained at internet address:www.acs.omnibooksonline.com/papers/2001_12.5.pdf, 5 pgs. Lee, Jinyong, "*Preparation of Large-Scale Carbon Fiber Reinforced Carbon Matrix Composites (C-C) By Thermal Gradient Chemical Vapor Infiltration (TGCVI),*"obtained at internet address: www.x-cd.com/papers/cesp_v26_i8_121.pdf, pp. 121-126.

(Continued)

*Primary Examiner* — Jacob Thomas Minskey
(74) *Attorney, Agent, or Firm* — Snell & Wilmer L.L.P.

(57) ABSTRACT

A carbon/carbon part and a process for making carbon/carbon parts is provided. The process involves forming steps, carbonization steps and densification steps. The forming steps may include needling fibrous layers to form fibers that extend in three directions. The carbonization steps may include applying pressure to increase the fiber volume ratio of the fibrous preform. The densification steps may include filling the voids of the fibrous preform with a carbon matrix.

30 Claims, 3 Drawing Sheets

(56) References Cited

U.S. PATENT DOCUMENTS

| | | | |
|---|---|---|---|
| 5,869,411 A | 2/1999 | Bazshushtari et al. | 442/340 |
| 5,935,359 A * | 8/1999 | Sohda et al. | 156/89.26 |
| 5,989,375 A | 11/1999 | Bortz | 156/148 |
| 6,105,223 A | 8/2000 | Brown et al. | 28/111 |
| 6,183,583 B1 | 2/2001 | Duval et al. | 156/148 |
| 6,217,997 B1 | 4/2001 | Suyama et al. | |
| 6,221,291 B1 | 4/2001 | Van Ert et al. | |
| 6,248,417 B1 | 6/2001 | Ponsolle et al. | 428/66.2 |
| 6,360,412 B1 | 3/2002 | Duval et al. | 28/107 |
| 6,405,417 B1 | 6/2002 | Sheehan et al. | 28/107 |
| 2005/0178327 A1 * | 8/2005 | Rudolph et al. | 118/715 |

OTHER PUBLICATIONS

European Search Report dated Jan. 13, 2012 in Application No. 07749603.2.
European Search Report dated Jun. 26, 2012 in Application No. 07749603.2.
International Search Report dated Jul. 28, 2008 in Application No. PCT/US2007/002629.
Written Opinion dated Jul. 28, 2008 in Application No. PCT/US2007/002629.
International Preliminary Report on Patentability dated Feb. 13, 2009 in Application No. PCT/US2007/002629.

* cited by examiner

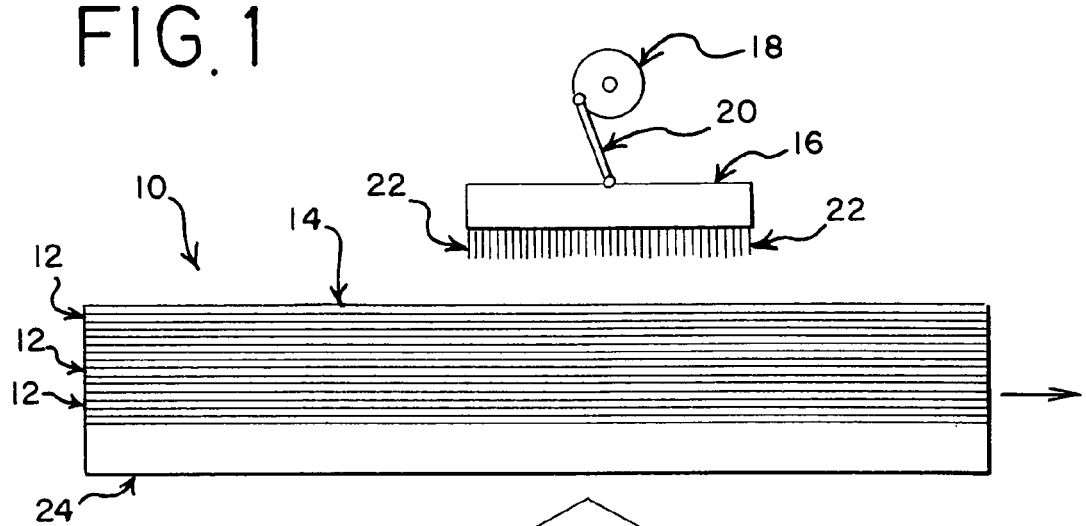
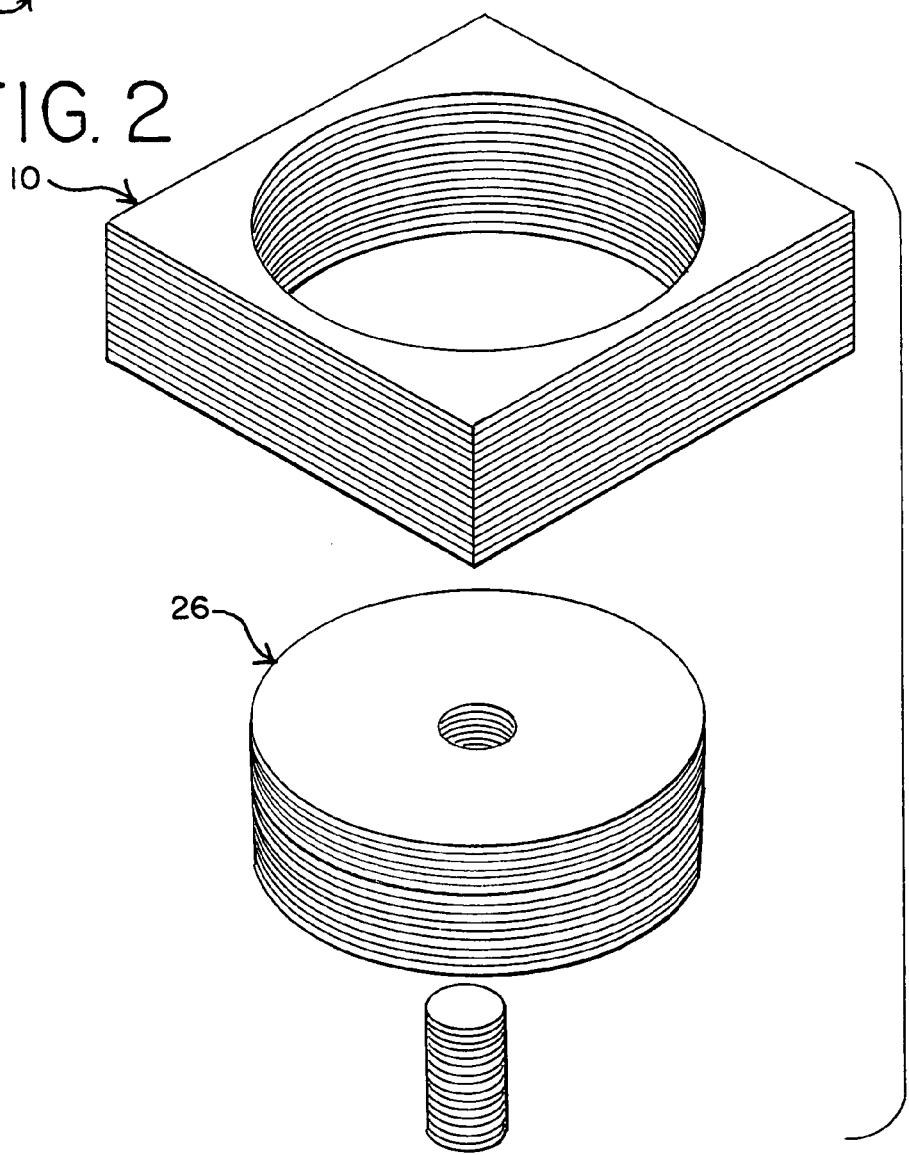

CARBON-CARBON PARTS AND METHODS FOR MAKING SAME

BACKGROUND

The present invention relates generally to the manufacture of carbon/carbon parts, and more particularly to a needled, fibrous preform that is compacted during carbonization.

Carbon/carbon parts ("C/C") in the form of friction disks are commonly used for aircraft brake disks and race car brake and clutch disks. Carbon/carbon brake disks are especially useful in these applications because of the superior high temperature characteristics of C/C material. In particular, the carbon/carbon material used in C/C parts is a good conductor of heat and is able to dissipate heat generated during braking away from the braking surfaces. Carbon/carbon material is also highly resistant to heat damage, and thus, is capable of sustaining friction between brake surfaces during severe braking without a significant reduction in the friction coefficient or mechanical failure.

In general, there are currently two primary methods of manufacturing C/C materials. The first method involves the layup and cure of a carbon fiber, phenolic resin matrix composite, followed by pyrolysis and subsequent phenolic resin infiltration and pyrolysis cycles. Multiple resin infiltration and pyrolysis cycles are typically used until the part achieves the desired density. The second method involves fabrication of an oxidized PAN or carbon fiber preform, followed by carbonization and chemical vapor infiltration (CVI) densification. The chemical vapor infiltration cycles are continued, in conjunction with machining the preform between infiltration cycles if desired, until the desired part density is achieved. Combinations of these two basic process methods are also in use and may include variations in preform architecture, infiltration resin type, and chemical vapor infiltration conditions.

In general, C/C parts produced using the oxidized PAN fiber, carbonization, and CVI densification method are made in three successive manufacturing steps. First, a fibrous preform is made utilizing a variety of textile manufacturing techniques. Typically, the fibrous preform is made from oxidized polyacrylonitrile (PAN) fiber ("OPF"). Although numerous techniques are known in the art for making fibrous preforms from OPF, a common technique involves stacking layers of OPF to superimpose the layers. The added layers may then be needled perpendicularly to the layers with barbed, textile needles. The needling process generates a series of z-fibers through the fibrous preform that extend perpendicularly to the fibrous layers. The z-fibers are generated through the action of the needles pushing fibers from within the layer (x-y or in-plane) and reorienting them in the z-direction (through-thickness). Needling of the fibrous preform may be done as one or more layers are added to the stack or may be done after the entire stack is formed. The needles may also penetrate through only a portion of the preform or may penetrate through the entire preform. In addition, resins are sometimes added to the fibrous preform by either injecting the resin into the preform following construction or coating the fibers or layers prior to forming the fibrous preform.

After the fibrous preform is made, it is carbonized to convert the OPF into carbon fibers. Typically, fibrous preforms are carbonized by placing the preforms in a furnace with an inert atmosphere. As well-understood by those in the art, the heat of the furnace causes a chemical conversion which drives off the non-carbon chemicals from the preform. The resulting preform generally has the same fibrous structure as the fibrous preform before carbonizing. However, the OPF have been converted preferably to almost 100% carbon.

After the preform has been carbonized, the preform is densified. In general, densification involves filling the voids, or pores, of the fibrous preform with additional carbon material. This may be done using the same furnace used for carbonization or a different furnace. Typically, chemical vapor infiltration and deposition ("CVI/CVD") techniques are used to densify the porous fibrous preform with a carbon matrix. This commonly involves heating the furnace and the carbonized preforms, and flowing hydrocarbon gases into the furnace and around and through the fibrous preforms. As a result, carbon from the hydrocarbon gases separates from the gases and is deposited on and within the fibrous preforms. When the densification step is completed, the resulting C/C part has a carbon fiber structure with a carbon matrix infiltrating the fiber structure, thereby deriving the name "carbon/carbon".

BRIEF SUMMARY

A process for making a carbon/carbon part is described. The process includes forming a fibrous preform, carbonizing the fibrous preform and densifying the fibrous preform. The forming step may involve superimposing layers of OPF and needling the layers to form z-fibers through the stack of fibrous layers. The carbonization step may involve compressing individual OPF fibrous preforms or a stack of OPF fibrous preforms during carbonization with a dead weight, multiple weights or alternative techniques. Preferably, the fibrous preforms are squeezed until stops located about adjacent separator plates prevent further compression. The resultant compressed carbonized fibrous preforms maintain their dimensions after the carbonization step for transfer to a densification furnace. The densification step may involve directing hot hydrocarbon gases around and through the fibrous preforms to deposit a matrix of carbon within pores of the fibrous preforms. Additional details and advantages are described below and shown in the attached drawings.

BRIEF DESCRIPTION OF SEVERAL VIEWS OF THE DRAWINGS

The invention may be more fully understood by reading the following description in conjunction with the drawings, in which:

FIG. 1 is a schematic view of a needling operation;

FIG. 2 is a perspective view, showing an annular fibrous preform cut from a rectangular preform;

DETAILED DESCRIPTION

Figure 4:
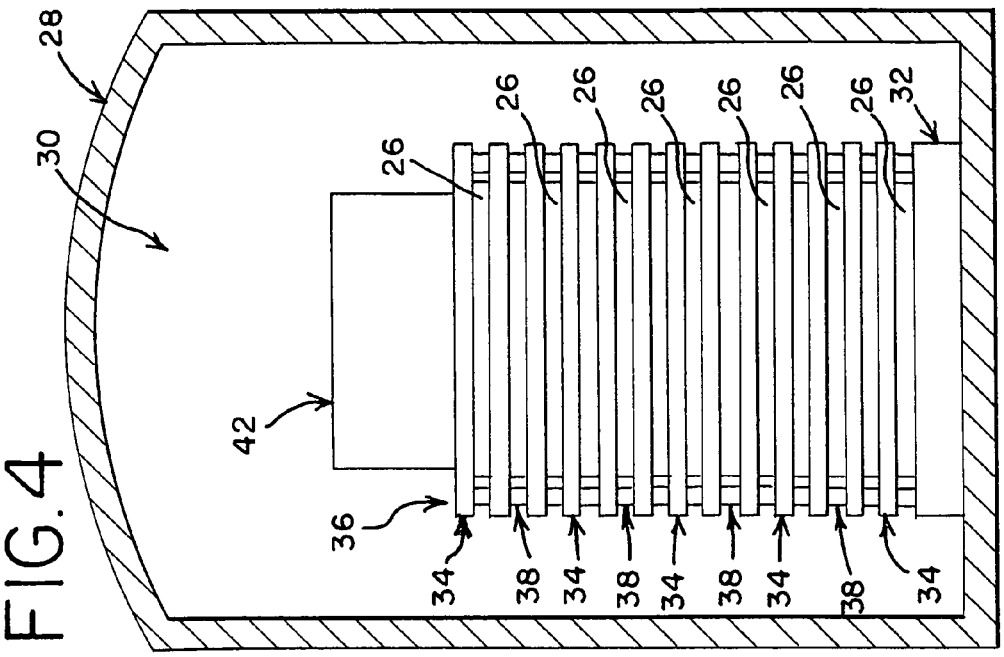
FIG. 4 is a schematic view of the carbonization furnace after carbonization.

Referring now to the drawings, and particularly to FIG. 1, a schematic diagram is shown of a needling operation that may be used to form a fibrous preform 10. Typically, the fibrous preform 10 is formed by superimposing a number of fibrous layers 12 on top of each other. The fibrous layers 12 are usually made from oxidized polyacrylonitrile fiber ("OPF"). The fibrous layers 12 may be made in a variety of ways and may include discrete (staple) or continuous fibers, unidirectional or cross-layered fibers or braided structures.

The fibrous layers 12 may also be preprocessed in various ways, such as pre-needling processes, to make the fibrous layers more coherent.

Preferably, the fibrous layers 12 are placed on top of each other one-by-one. After each fibrous layer 12 is placed on top of the stack 14 of fibrous layers 12, the stack 14 is needled with a needling head 16. Numerous types of needling techniques are possible. However, as shown, most needling processes include a needling head 16 that moves up and down in a reciprocating manner. A rotating wheel 18 and an off-center connecting rod 20 may be used to accomplish the desired reciprocating motion. A plurality of barbed needles 22 face the stack 14 of fibrous layers 12 and penetrate the fibrous layers 12 as the needling head 16 strokes downward. As a result, the barbs of the needles 22 push fibers from one fibrous layer to the next 12 to form z-fibers that extend perpendicularly across the fibrous layers 12. Needling pulls fibers from the in-plane direction and forces them into the z-fiber direction, thus decreasing in-plane fiber content which may reduce high-energy friction performance and in-plane mechanical strength in the final composite. In general, the needling process has the effect of interlocking the individual fabric layers together. Thus, after needling, the fibrous preform 10 has fibers extending in three different directions (i.e., in the x and y directions in the plane of the fibrous layers 12 and the z direction perpendicular to the fibrous layers 12). The entire surface of the stack 14 of fibrous layers 12 may be needled by moving the support bed 24 back-and-forth or the needling head 16 may be repositioned along the surface of the stack 14. Preferably, the needles 22 only penetrate a portion of the fibrous layers 12 with each down stroke without penetrating through the entire stack 14 of fibrous layers 12, except when the bottom layers in the stack 14 are needled.

As shown in FIG. 2, after all of the fibrous layers 12 have been placed on the stack 14 and the stack 14 has been needled, an annulus 26 may be cut from the stack 14 of fibrous layers 12. The resulting fibrous annular preform 26 is substantially composed of PAN or OPF extending in three directions through the fibrous preforms 26 and pores, or open spaces, extending therethrough. In a preferred embodiment, no other materials are used in forming the fibrous preform 26, such a resins or the like. In addition, the fibrous preform 26 is preferably formed without applying any compressive pressure to the fibrous preform 26, other than the pressure that is applied by the needles 22 during needling. As a result, the fiber volume (i.e., the ratio of the volume of fiber to the volume of the preform) of the OPF preform is between about 35% and 55%. Depending on the specific performance requirements of the final brake material, the fiber volume ratio after forming the fibrous preform may vary to satisfy particular requirements. It is also preferred in certain embodiments to use a low or moderate needling density, with a fiber volume ratio between about 35% and 50% after needling. For example, in a fibrous preform that is needled with a moderate needling density, the OPF fiber volume ratio is between 45% and 50%. A low needling density may also be desirable in certain embodiments, such as a fiber volume ratio between 35% and 45%.

Figure 3:
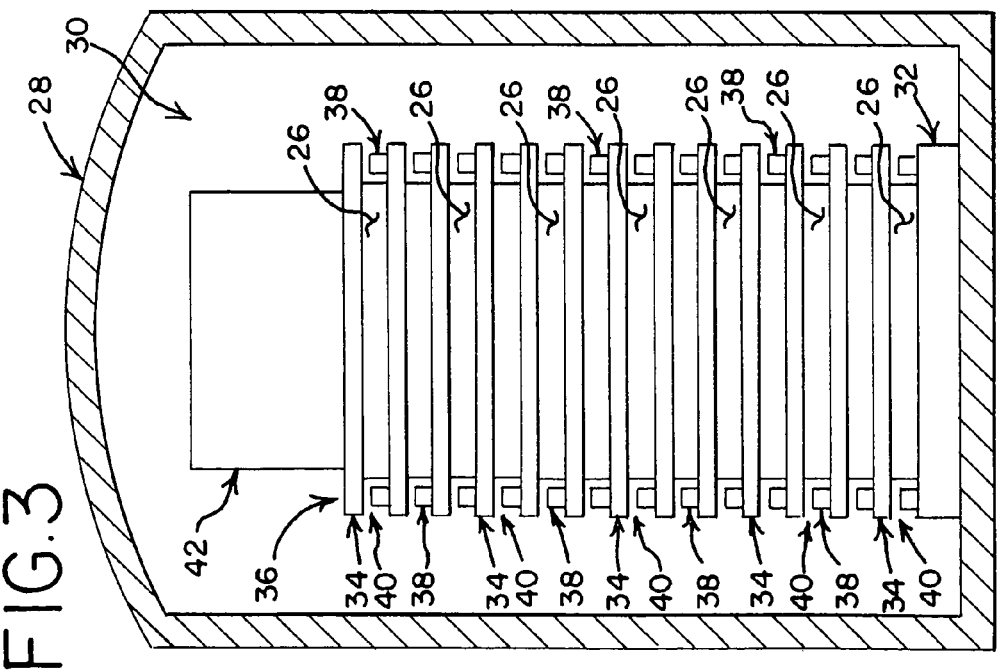
FIG. 3 is a schematic view of a carbonization furnace before carbonization.

Turning to FIGS. 3 and 4, the annular fibrous preforms 26 are placed in a furnace 28 for carbonization. As understood by those in the art, the carbonization process converts the OPF in the fibrous preforms 26 into substantially 100% carbon fibers. The carbonization process is distinguished from the densification process described below in that the densification process involves infiltrating the pores of the fibrous preform and depositing a carbon matrix within the fibrous preform. In contrast, carbonization refers only to the process of converting the fibers which are used to form the fibrous preform 26 into carbon fibers. Although it is possible to use pure carbon fibers in the needling process, it is generally undesirable to use pure carbon fibers when forming fibrous structures using typical textile machines because of the difficulties of working with pure carbon fiber. By contrast, carbonaceous fibers like PAN and OPF, which contain carbon in addition to other compounds, have been found to be much easier to work with during typical textile techniques used to form fibrous preforms. For example, PAN and OPF are more stretchable and resilient compared to carbon fiber, and thus, are easier to use in textile machinery. PAN and OPF are also less electrically conductive than carbon fibers, which makes PAN and OPF safer to work with and less harmful to electronic components in the preform manufacturing equipment. As a result, the carbonization process allows the fibrous preform 26 to be formed with fibers that are not pure carbon. The fibers that are used during the forming process are then converted during the carbonization process so that the final fibrous preform prior to densification 26 is made up of substantially pure carbon fibers. Although FIGS. 3, 4 and 5 and the description herein contemplate the use of at least two different furnaces 28, 46 for the carbonization and densification processes, it is possible to combine both processes in a single furnace if desired.

In general, the carbonization process involves heating the fibrous preforms 26 in a furnace 28 to a temperature greater than 1,600° C. Typically, an inert atmosphere of nitrogen, argon or a vacuum 30 is provided in the furnace 28 during the carbonization process. The heat of the furnace 28 causes a chemical conversion of the OPF which converts the fibers to carbon fibers and drives off other chemicals. Although it is preferred that the fibers in the carbonized preform 26 be 100% carbon fiber, it is generally acceptable for a slightly less than full conversion to take place, and the resulting carbon fiber may be as low as 99.5% carbon.

During carbonization, the total mass and the total fiber volume in each fibrous preform 26 is typically reduced due to the loss of non-carbon compounds. For example, a typical fibrous preform 26 may lose approximately 50% of its weight during carbonization. In addition, the overall volume of the fibrous preform 26 typically shrinks approximately 8-12% during carbonization. When these factors are combined, a typical OPF fibrous preform 26 which has a fiber volume ratio of between about 35% to 55% after the forming processes may have a fiber volume ratio of about 16% to 28% after the carbonization process. In this typical, prior art example, no additional compressive pressure is applied to the fibrous preform during the forming and carbonization processes, except for normal needling pressure, other nominal pressures related to typical textile techniques, regular handling pressures, and the weight of stacked fibrous preforms and the weight of stacking hardware. Therefore, a typical fibrous preform with a fiber volume ratio between about 48% and 50% after the forming process may have a fiber volume ratio of about 25% to 27% after carbonization. Similarly, a typical fibrous preform with a fiber volume ratio between about 40% and 45% after the forming process may have a fiber volume ratio of about 20% to 23% after carbonization. However, the content of fibers in the z-direction generally remains unchanged during carbonization. Typically, high z-fiber content results in a decrease in in-plane mechanical strength and a loss in high-energy friction coefficient.

Figure 5:
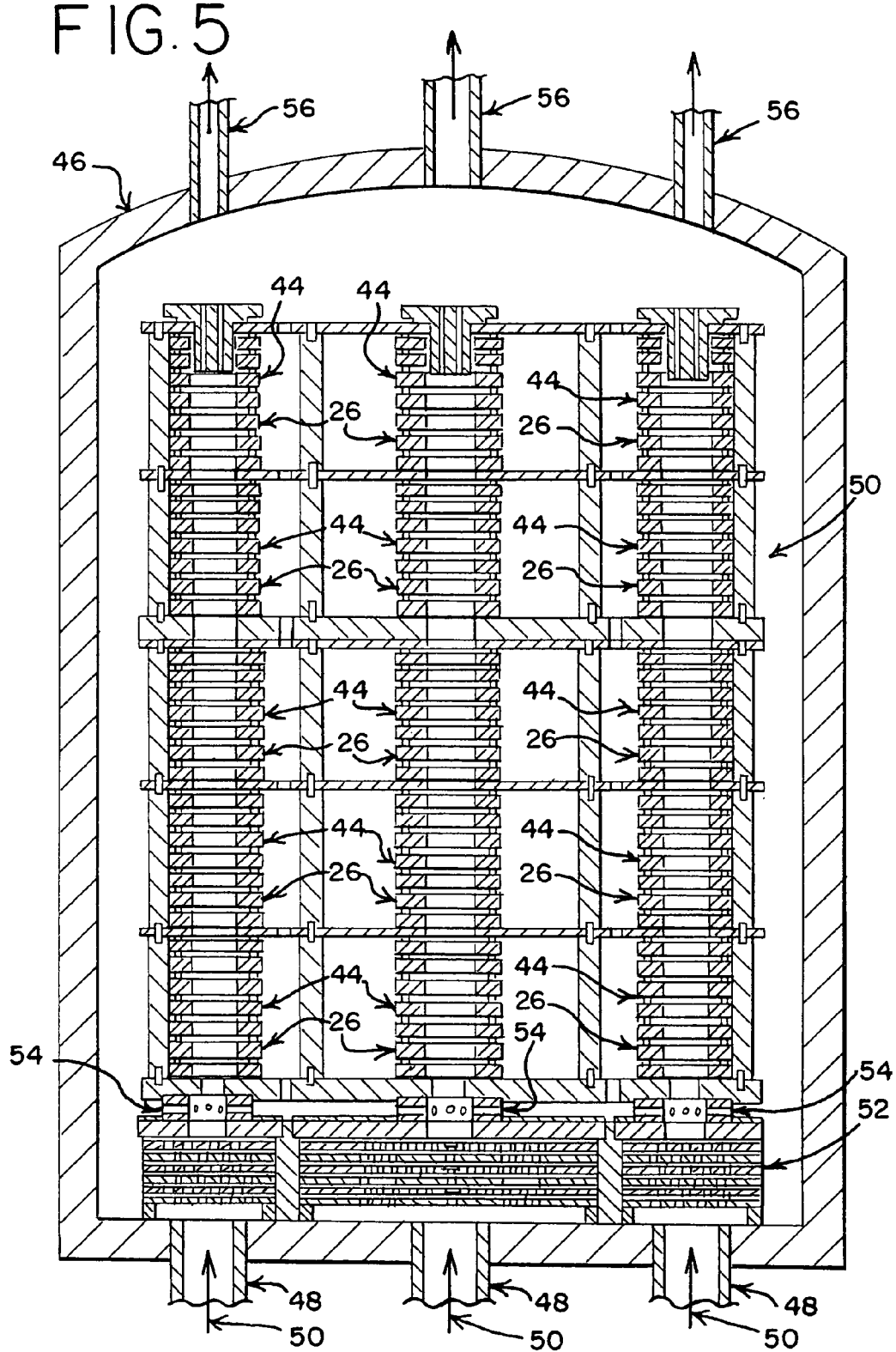
FIG. 5 is a schematic view of a densification furnace.

As shown in FIG. 3, additional compressive pressure may be applied to the fibrous preforms 26 during the carbonization process to increase the fiber volume ratio of the fibrous preforms 26 after carbonization, but without changing the z-fiber content. For example, a group of preforms may be placed on top of each other with separator plates and spacing stops between each part. Typically, the stops are designed at a height that is less than the thickness of the preform and defined by the target thickness of the preform after carbonization. For example, the bottommost fibrous preform 26 may be placed on a base plate 32 at the bottom of the carbonization furnace 28. A separator plate 34 may be placed on top of the bottommost preform 26. Another fibrous preform 26 may then be placed on the separator plate 34, and another separator plate 34 may be placed on that fibrous preform 26. A stack 36 of fibrous preforms 26 and separator plates 34 may be constructed in this manner, with each fibrous preform 26 being separated from superjacent and subjacent fibrous preforms 26 by separator plates 34. Stops 38 which are shorter than the thickness of each corresponding OPF fibrous preform 26 are placed between each of the separator plates 34. Thus, after the stack 36 of fibrous preforms 26 is constructed, and before the carbonization process has started, gaps 40 exist between the stops 38 and adjacent separator plates 34. Although FIGS. 3 and 4 show a single stack 36 of fibrous preforms 26 in the furnace 28 during carbonization, multiple stacks of fibrous preforms could also be placed in a larger furnace as shown in FIG. 5. Moreover, the stack 36 of fibrous preforms 26 may be constructed in the furnace 28 or may be constructed outside of the furnace 28 and moved into the furnace 28 after construction with lifting equipment. Also, multiple fibrous preforms may be placed between each separator plate with a stop to control the total thickness following carbonization. Thus, at least two fibrous preforms may be placed between two separator plates with a stop positioned between the two separator plates. As a result, the compression is combined for multiple preforms. This may be particular useful when the fibrous preforms have a thin thickness.

A compressive pressure is applied to the fibrous preforms 26 during the carbonization process. This may be accomplished by placing a dead weight 42 on top of the stack 36 of fibrous preforms 26 after the stack 36 is constructed, or by applying an external load to the stack of parts through alternate means. Thus, the compressive pressure may be applied along the direction of the z-fibers which are formed during the needling process. Preferably, the weight of the dead weight 42 is at least 150 lbs and generates a compressive force of 0.50 psi, but more or less may be used depending on the size of the preform being compressed and the z-fiber content and resultant compressibility of the fibrous preform. For example, it is particularly desirable for the dead weight 42 to be between 275 and 425 lbs and generate a compressive force of between 1.0 and 2.0 psi for a fibrous preform with an OPF fiber volume ratio between about 40% and 45%. The dead weight 42 is left on the stack 36 of fibrous preforms 26 during the carbonization process to maintain a compressive pressure on the stack 36. The compressive pressure may be measured as a pressure in psi (lb/in$^2$) applied to one fibrous preform 26 in the stack 36. For example, a pressure between about 0.50 lb/in$^2$ and 2.0 lb/in$^2$ may be applied to the top fibrous preform 26 in the stack 36. This pressure may be applied with a dead weight 42 or in other ways. If a dead weight 42 is applied as shown, it is understood that the compressive pressure may be somewhat less on the top fibrous preform 26 than on the bottom fibrous preform 26 in the stack 36 due to the added weight of the preforms 26 and stacking hardware.

As shown in FIG. 4, the compressive pressure during carbonization squeezes the fibrous preforms 26 until the stops 38 about the adjacent separator plates 34, thus eliminating the initial gaps 40 between the stops 38 and the separator plates 34. The relationship between the size of the stop 38 that is used and the initial gap 40 may vary based on the type of carbon/carbon part being made, the fiber volume and z-fiber content of the fibrous preform, and the desired fiber volume of the carbonized preform. Depending on the specific target fiber volume, the design of the hardware, such as the sizing of stops, may be predetermined to achieve a total thickness shrinkage between about 25% and 45%. In contrast, non-loaded shrinkage is normally about 8% to 13% without hardware limits used to predetermine the amount of thickness shrinkage.

At the preform stage and after carbonization, the fibrous preforms 26 preferably have a structure of carbon fibers extending in three directions through the fibrous preform 26 and pores extending therethrough. However, because of the compressive pressure applied during carbonization, the total fiber volume ratio is increased. For example, the fiber volume ratio after carbonization is preferably about 25% or greater. The fiber volume ratio may also be increased by applying compressive pressure during carbonization so that the fiber volume ratio is greater than 23% after carbonization. In particular, it is desirable to achieve a fiber volume ratio between about 27% and 30% after carbonization by applying pressure to the fibrous preforms 26 during carbonization, while maintaining the same z-fiber content of the fibrous preform prior to carbonization. For example, in a preform with high needling density, the fiber volume ratio may be between about 50% and 55% after forming the fibrous preform. After carbonization, the fiber volume ratio may be between about 25% and 27% without compressive pressure and between about 28% and 30% with compressive pressure applied. Needling density, or z-fiber content, may be measured as a thermal ratio after a carbon-carbon part has been densified. The thermal ratio is the ratio of thermal conductivity of the part through the thickness of the part (i.e., in the z direction) divided by the thermal conductivity of the part across a width of the part (i.e., in the x-y plane). As well understood by those in the art, thermal conductivity may be measured as watts/m·K. In general, a preform that is needled with a high needling density will result in a thermal ratio higher than about 0.8. Similarly, in a preform with a lower needling density, the fiber volume ratio may be between about 35% and 45% after forming the fibrous preform. After carbonization, the fiber volume ratio may be between about 16% and 23% without compressive pressure and between about 25% and 30% with compressive pressure applied. In general, a preform that is needled with a low needling density will result in a thermal ratio less than about 0.55. Further, in a preform with a fiber volume ratio between about 40% and 45% after forming the fibrous preform, the fiber volume ratio may be between about 20% and 23% without compressive pressure and between about 27% and 30% with compressive pressure after carbonization. The actual fiber volume target is dependant on the desired friction and wear characteristics and the z-fiber content of the OPF fibrous preform. Thus, the combination of z-fiber content and compressed preform fiber volume ratio may be used to achieve desired friction and wear characteristics.

After the fibrous preforms have been carbonized, the fibrous preforms 26 may be removed from the carbonization furnace 28. The dead weight 42 may be removed from the stack 36 of fibrous preforms 26 at this point, and the fibrous preforms 26 maintain their higher fiber volume ratio without the need for further application of compressive pressure. The fibrous preforms 26 may be disassembled from the stack 36, if desired, to allow for inspection and/or other processing steps.

As shown in FIG. 5, after the carbonization process, the fibrous preforms 26 are placed in stacks 44 in a densifying furnace 46. As well known to those in the art, the densification process deposits a carbon matrix within the pores of a fibrous preform. Many different types of densification processes may be used to densify fibrous preforms. For example, in FIG. 5, the densifying furnace 46 is provided with inlet ducts 48 for introducing a hydrocarbon gas or mixture of gases 50 into the furnace 46, such as natural gas or propane. A preheater 52 may also be provided inside of the furnace 46 to heat the hydrocarbon gas mixture 50 to its final temperature. Typically, a furnace temperature of about 1,000° C. is preferred for the densification process.

A distributor 54 or other arrangements and structures may be used in the furnace 46 to direct the hot hydrocarbon gas mixture 50 around the fibrous preforms 26 as desired. Preferably, some of the hydrocarbon gas mixture 50 is forced to flow through the porous structure or across the flat surfaces of the fibrous preforms 26. As the hydrocarbon gas mixture 50 passes around and through the fibrous preforms 26, carbon breaks off from the hydrocarbon molecules and is deposited onto the carbon fibers of the fibrous preforms 26. The leftover gases 50 exit the furnace 46 through outlet ducts 56, and fresh hydrocarbon gases 50 are continually supplied to the furnace 46 through the inlet ducts 48. As the densification process continues, a matrix of carbon forms within and on the fibrous preforms 26. As a result, the pores of the fibrous preforms 26 are filled or at least partially filled with carbon. When the fibrous preforms 26 have been densified to the desired level, the flow of hydrocarbon gases 50 to the furnace 46 is stopped, and the densified fibrous preforms 26 may be removed from the densifying furnace 46. The densified preforms 26 may then be cleaned, machined and further processed for their final use.

One advantage of carbon/carbon parts made by the described process is that they are especially suited for use as brake disks for large passenger jet aircrafts. When used in such applications, the described process may be used to manufacture brake disks with a higher friction coefficient then conventional carbon/carbon brake disks. For example, in comparable carbon/carbon brake disks, the friction coefficient at RTO (i.e., "rejected take-off") may be increased from the range of about 0.11 to 0.14 for conventional carbon/carbon brake disks to the range of about 0.16 to 0.19 for carbon/carbon brake disks made by the improved process, an increase of approximately 40%. In addition, carbon/carbon brake disks made by the improved process may be more durable and may wear at a lower rate. For example, whereas conventional carbon/carbon brake disks may wear at the rate of about 0.090 to 0.110 inches/surface/1000 landings, carbon/carbon brake disks made by the improved process may wear at the rate of about 0.060 to 0.075 inches/surface/1000 landings or lower for the same brake operational parameters, an improvement of approximately 35%. The demonstrated improvements are significant in that they provide opportunity for improvements in brake design characteristics, including possible weight savings, and more importantly, improvements in financial returns as a result of longer wear life. The described process is also advantageous because it is readily adaptable to present manufacturing processes without the need for significant changes to the manufacturing process or the equipment used in the process. Two representative examples are provided below for a comparison of some of the advantages of processes described above.

Example 1

A series of fibrous preforms may be manufactured using typical textile needling equipment to a relatively low z-fiber concentration. The outside diameter ("OD"), inner diameter ("ID") and thickness of the preform may be about 20" to 22", 10" to 12" and 1.75" to 2.50", respectively, depending on the specific rotor, stator, end-plate or pressure plate being made. A fiber volume ratio after the forming steps of 44% may typically be achieved with these processes. The preform may be carbonized using compression plates, stops and approximately 450-500 lbs of dead weight so that the carbonized preform fiber volume ratio is about 29%. The thickness shrinkage of the preform during carbonization in this example may be approximately 42%. The resultant carbonized preform is then densified using a typical carbon CVI process. When machined to a brake disk geometry, the preform may have an exemplary wear rate of about 0.081 and an exemplary RTO friction coefficient of about 0.146. By comparison, preforms processed using similar methods but carbonized without compression may have an exemplary wear rate of about 0.102 and an exemplary RTO friction coefficient of about 0.134.

Example 2

A series of fibrous preforms may be manufactured using typical textile needling equipment to both a low z-fiber concentration and to a mid-range z-fiber concentration. For low z-fiber concentration preforms, a fiber volume ratio after the forming steps of 38% and 44% may typically be achieved with these processes. For mid-range z-fiber concentration performs (i.e., moderate needling), a fiber volume ratio after the forming steps of 49% may typically be achieved with these processes. The preforms may be carbonized using compression plates, stops and approximately 400 lbs of dead weight. Shrinkage during carbonization in this example may be approximately 43% and 40%. Following carbonization, the low z-fiber concentration preform with an initial fiber volume ratio of 38% and 44% and using compression during carbonization may exhibit a carbonized fiber volume ratio of about 27%. The mid-range z-fiber concentration preform with an initial fiber volume ratio of 49% may exhibit a carbonized fiber volume ratio of about 27%. In general, a preform that is needled with a moderate needling density will result in a thermal ratio between about 0.55 and about 0.8. Typically, with a moderate needling density, the fiber volume ratio after carbonizing is preferably between about 27% and about 30%. The resultant carbonized preforms are then densified using a typical carbon CVI process. When machined to a brake disk geometry, the low z-fiber concentration preform may have an exemplary wear rate of about 0.057 and 0.065, and an exemplary RTO friction coefficient of about 0.199 and 0.165. The mid-range z-fiber concentration preform may have an exemplary wear rate of about 0.047 and an exemplary RTO friction coefficient of about 0.161. By comparison, the low z-fiber concentration preform with an initial fiber volume ratio of 44% processed using similar methods but carbonized without compression may exhibit a carbonized fiber volume ratio of about 21%. Such preforms may have an exemplary wear rate of about 0.095 and an exemplary RTO friction coefficient of about 0.145.

While preferred embodiments of the invention have been described, it should be understood that the invention is not so limited, and modifications may be made without departing from the invention. The scope of the invention is defined by the appended claims, and all devices that come within the meaning of the claims, either literally or by equivalence, are intended to be embraced therein. Furthermore, the advantages described above are not necessarily the only advantages of the invention, and it is not necessarily expected that all of the described advantages will be achieved with every embodiment of the invention.

We claim:

1. A method of manufacturing a carbon-carbon part, comprising:
   loading a fibrous preform into a stack having a first plate, a second plate and a spacer,
   wherein said fibrous preform comprises polyacrylonitrile (PAN) fibers extending in multiple directions and has pores extending therethrough, wherein a fiber volume ratio of said fibrous preform after said forming is between about 35% and about 55%;
   carbonizing said fibrous preform by heating said fibrous structure to convert said fibers into substantially carbon fibers,
   disposing a dead weight on said stack at a point above said first plate so as to apply mechanical pressure to said fibrous preform during said carbonization step to compress a thickness of said fibrous preform about 25% or greater to thereby increase said fiber volume ratio of said fibrous preform, wherein said fiber volume ratio of said fibrous preform after said carbonizing is about 25% or greater, and wherein said compression is limited by said spacer; and
   densifying said fibrous preform by depositing a carbon matrix within at least a portion of said pores.

2. The method according to claim 1, wherein said fibrous preform is formed with OPF.

3. The method according to claim 1, wherein said forming step comprises superimposing a number of fibrous layers to form a stack and needling said fibrous layers to form z-fibers extending perpendicularly to said fibrous layers, and said mechanical pressure is applied along a direction of said z-fibers.

4. The method according to claim 3, wherein a portion of said fibrous layers are needled prior to superimposing additional fibrous layers on said stack and said needling prior to superimposing additional fibrous layers does not penetrate through all subjacent layers.

5. The method according to claim 4, wherein said forming step comprises cutting an annulus from said fibrous layers after superimposing said fibrous layers on said stack and needling said fibrous layers.

6. The method according to claim 3, wherein a thermal ratio of said fibrous preform after said densifying is about 0.55 or less.

7. The method according to claim 3, wherein a thermal ratio of said fibrous preform after said densifying is between about 0.55 and about 0.8.

8. The method according to claim 3, wherein said fiber volume ratio of said fibrous preform after said forming is between about 35% and about 45% and said fiber volume ratio of said fibrous preform after said carbonizing is between about 25% and about 30%.

9. The method according to claim 8, wherein a thermal ratio of said fibrous preform after said densifying is about 0.55 or less.

10. The method according to claim 3, wherein said fiber volume ratio of said fibrous preform after said forming is between about 50% and about 55% and said fiber volume ratio of said fibrous preform after said carbonizing is between about 28% and about 30%.

11. The method according to claim 10, wherein a thermal ratio of said fibrous preform after said densifying is about 0.8 or greater.

12. The method according to claim 3, wherein said fiber volume ratio of said fibrous preform after said forming is between about 40% and about 45% and said fiber volume ratio of said fibrous preform after said carbonizing is between about 27% and about 30%.

13. The method according to claim 12, wherein a thermal ratio of said fibrous preform after said densifying is about 0.55 or less.

14. The method according to claim 3, wherein said fiber volume ratio of said fibrous preform after said forming is between about 45% and about 50% and said fiber volume ratio of said fibrous preform after said carbonizing is between about 27% and about 30%.

15. The method according to claim 14, wherein a thermal ratio of said fibrous preform alter said densifying is between about 0.55 and about 0.8.

16. The method according to claim 1, wherein said fibrous preform is compressed during said carbonization by said dead weight until said spacer abuts said first plate and said second plate.

17. The method according to claim 16, wherein said dead weight is at least 150 lbs.

18. The method according to claim 1, wherein said fibrous preform is one fibrous preform in a stack of fibrous preforms during said carbonizing, said pressure applied to said fibrous preform is about 0.50 lb/in2 or greater.

19. The method according to claim 1, wherein said forming step comprises superimposing a number of fibrous layers to form a stack and needling said fibrous layers to form z-fibers extending perpendicularly to said fibrous layers, and said mechanical pressure applied along a direction of said z-fibers; a portion of said fibrous layers are needled prior to superimposing additional fibrous layers on said stack and said needling prior to superimposing additional fibrous layers does not penetrate through all subjacent layers; and said applying mechanical pressure to said fibrous preform during said carbonizing comprises stacking said fibrous preform with additional fibrous preforms to form a stack of fibrous preforms wherein said fibrous preform is compressed during said carbonization by said dead weight until said spacer abuts said first plate and said second plate.

20. The method according to claim 19, wherein said fiber volume ratio of said fibrous preform after said forming is about 45% or less, said fiber volume ratio of said fibrous preform after said carbonizing being about 27% or greater, and a thermal ratio of said fibrous preform after said densifying is about 0.55 or less.

21. The method according to claim 20, wherein said forming step comprises cutting an annulus from said fibrous layers after superimposing said fibrous layers on said stack and needling said fibrous layers.

22. The method according to claim 1, wherein said fibrous preform is formed with OPF; said forming step comprises superimposing a number of fibrous layers to form a stack and needling said fibrous layers to form z-fibers extending perpendicularly to said fibrous layers, and said mechanical pressure is applied along a direction of said z-fibers; and said forming step comprises cutting an annulus from said fibrous layers after superimposing said fibrous layers on said stack and needling said fibrous layers.

23. The method according to claim 22, wherein said fibrous preform is one fibrous preform in a stack of fibrous preforms during said carbonizing, said mechanical pressure applied to said fibrous preform being about 0.50 lb/in2 or greater.

24. The method according to claim 23, wherein said fiber volume ratio of said fibrous preform after said forming is about 45% or less, said fiber volume ratio of said fibrous preform after said carbonizing being about 27% or greater, and a thermal ratio of said fibrous preform after said densifying is about 0.55 or less.

25. A method of manufacturing a carbon-carbon part, comprising:
   loading a fibrous preform into a stack having a first plate, a second plate and a spacer,
   said fibrous preform comprising oxidized polyacrylonitrile (OPF) fibers extending in multiple directions and having pores extending therethrough, wherein a fiber volume ratio of said fibrous preform after said forming is about 50% or less;
   carbonizing said fibrous preform by heating said fibrous structure to convert said fibers into substantially carbon fibers, and
   disposing a dead weight on said stack at a point above said first plate so as to apply mechanical pressure to said fibrous preform during said carbonization step to compress a thickness of said fibrous preform to thereby increase said fiber volume ratio of said fibrous preform, wherein said fiber volume ratio of said fibrous preform after said carbonizing is greater than 23%, and wherein said compression is limited by said spacer; and
   densifying said fibrous preform by depositing a carbon matrix within at least a portion of said pores.

26. The method according to claim 25, wherein a thermal ratio of said fibrous preform after said densifying is about 0.55 or less.

27. The method according to claim 25, wherein said fiber volume ratio of said fibrous preform after said carbonizing is about 25% or greater.

28. The method according to claim 27, wherein a thermal ratio of said fibrous preform after said densifying is about 0.8 or less.

29. The method according to claim 28, wherein said fiber volume ratio of said fibrous preform after said forming is about 45% or less.

30. The method according to claim 29, wherein a thermal ratio of said fibrous preform after said densifying is about 0.55 or less.

* * * * *